(No Model.)
H. GERBO.
CLOTHES SUSPENDING DEVICE.
No. 435,117. Patented Aug. 26, 1890.
Fig 1
Fig 2
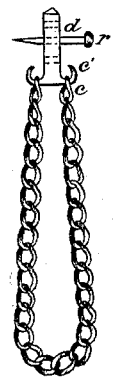
Fig 3
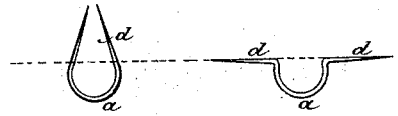
Fig 4  Fig 4ª
Witnesses:
Inventor:
Henri Gerbo,
By Church & Church
his Attys.

UNITED STATES PATENT OFFICE.

HENRI GERBO, OF BRUSSELS, BELGIUM.

CLOTHES-SUSPENDING DEVICE.

SPECIFICATION forming part of Letters Patent No. 435,117, dated August 26, 1890.

Application filed March 19, 1890. Serial No. 344,587. (No model.) Patented in Belgium November 23, 1889, No. 88,579, and February 8, 1890, No. 89,451; in France February 21, 1890, No. 203,905, and in England February 26, 1890, No. 3,076.

*To all whom it may concern:*

Be it known that I, HENRI GERBO, a subject of the King of the Belgians, residing at Brussels, in Belgium, have invented certain new and useful Improvements in or Relating to Clothes-Suspending Devices, (for which I have applied for Letters Patent in Great Britain, No. 3,076, dated February 26, 1890; in Belgium by a patent of invention dated November 23, 1889, No. 88,579, and patent for improvements annexed to the same and dated February 8, 1890, No. 89,451, and in France by patent dated February 21, 1890, No. 203,905,) of which the following is a specification.

The removable chains such as are at present attached to clothes—for example, to coats—by which they may be hung up are attended by serious drawbacks, mainly resulting from the fact that owing to the weight of the article suspended acting upon the two points to which the ends of the said chains are attached a fold forms in the collar, which is thereby deformed, besides being damaged by the contact and friction which take place between the chain and the material, especially velvet or fur. As the chain is throughout its length in frictional contact with the coat-collar, the chain having the same contact with the shirt-collar and cravat, these two parts are also worn out the same way, and besides considerable inconvenience is caused to the wearer, who experiences an uncomfortable strain upon his neck. Systems capable of being, when out of use, unlocked by keys have indeed been devised before this; yet not only is it by no means easy to connect and disconnect the same by means of the key, but in addition to this the latter is very liable to be lost.

The object of the improvements herein described is to obviate these divers defects, while they at the same time notably reduce the cost of the chains used.

These improvements mainly consist in connecting both ends of the chain or cord whereby the article of dress is to be suspended to a common ring, link, or cross-piece attached to the said article, and in fixing such ring, link, or cross-piece, or a combination of them, to the end of a screwed pin passing through the collar of such article of dress, while the opposite end of the said pin is adapted to receive a nut provided with two wings whereby the same may be screwed backward and forward upon the said screw-threaded pin; also, in providing the link or cross-piece with projections, which, when the chain is tightened onto the cloth by means of the said nut, are thereby forced into the material, and thus prevent the pin from turning and the nut from spontaneous loosening; or the pin may also be held in position by means of a peg, which, after the said pin is passed through the cloth, is inserted transversely into an eye or opening provided for the purpose in the pin. This pin may also, if desired, be made in the shape of a staple, the two branches or ends of which are normally close to each other, but which after the staple is passed through the cloth are bent or turned down in opposite directions, so as to secure the same in place, leaving outside the collar a ring to which both ends of the chain are to be attached.

In the accompanying drawings several examples of my invention are represented, showing the manner in which it may be applied in practice.

In Figure 1 both the ends of a chain are connected by means of one ring $a$, linked to a yoke $b$, the two ends of which are supported by a cross-piece or bridge $c$. In the center of this bridge a circular socket is provided, through which is passed one of the ends of the screw-threaded pin $d$, which is then suitably riveted in place. The two ends of the bridge $c$ are turned upward, as shown in $c'$, which enables them to engage the cloth, and thus prevent the bridge from turning about its axis. A nut $e$ with two wings $f$ is adapted to secure the said bridge in the material by forcing into the latter the two projecting ends or points of the bridge.

In the arrangement illustrated in Fig. 2 the yoke $b$ is dispensed with and the two end links of the chain are passed directly over the points $c'$ of the bridge or cross-piece $c$, which points are bent, so as to prevent the said chain-links from slipping off of their own accord. The pin $d$ may also, as shown in Fig.

3, be provided with one or more openings, so that after the same has been passed through the material a peg r may be inserted into one of such openings, and thus the material compressed between it and the bridge or cross-piece c with its upturned ends c'.

Figs. 4 and 4ª show a modification, wherein the pin to which both ends of the suspension-chain are to be attached is replaced by a staple. The two branches or ends d of the staple in their normal position are situated close to each other, so as practically to form a ring common to both ends of the chain, as shown at a, and after such branches have been passed through the material they are on one side of the latter turned down in opposite directions, as shown in Fig. 4ª, while on the opposite side the central portion of the staple still forms the connecting ring or link for the two ends of the chain to be attached to. To apply such a suspension device to an article of dress, a hole is first made in the collar or any convenient part of such article by means of a punch or other suitable tool or instrument. Then the pin or the two ends of the staple is or are passed through such hole and fastened on the opposite side, as described above. The unfastening of the device is effected by operating inversely.

I claim—

1. In a device for suspending garments, the combination, with the attaching-pin adapted to pass through the garment, of the single length of chain or cord having both its ends secured to said pin, substantially as described.

2. A removable device for the suspension of garments, consisting of a length of chain or cord both ends of which are attached to one ring or cross-piece, the ends of which are pointed and bent, so as to be embedded in the material, substantially as described.

3. In combination with the chain or cord and the cross-piece with vertical points wherewith it is connected, a screw-threaded pin fixed to the said cross-piece, and a nut provided with arms or wings screwed onto such pin and to tighten and secure the said cross-piece upon and into the material of the article of dress, substantially as and for the purpose described.

4. In a device for suspending garments, the combination, with the single attaching-pin adapted to pass through the garment and having the cross-piece with the ends pointed and turned in to penetrate the material, of the chain or cord having both its ends held by said cross-piece, substantially as described.

5. In a device for suspending garments, the combination, with the single screw-threaded attaching-pin adapted to pass through the garment, having the cross-piece with the inwardly-turned ends, and the nut for holding the pin in place, of the length of chain or cord having both its ends held by said cross-piece, substantially as described.

In testimony whereof I have signed this specification in the presence of two subscribing witnesses.

HENRI GERBO.

Witnesses:
GREGORY PHELAN,
GEORGE BEDE.